United States Patent
Hess et al.

(10) Patent No.: US 7,837,110 B1
(45) Date of Patent: Nov. 23, 2010

(54) MAGNETIC STRIPE READER HAVING DIGITAL PEAK DETECTOR

(75) Inventors: Mark Hess, San Francisco, CA (US); Raymond O. Chock, San Jose, CA (US)

(73) Assignee: Maxim Integrated Products, Inc., Sunnyvale, CA (US)

( * ) Notice: Subject to any disclaimer, the term of this patent is extended or adjusted under 35 U.S.C. 154(b) by 1392 days.

(21) Appl. No.: 11/139,415

(22) Filed: May 28, 2005

(51) Int. Cl.
*G06K 7/08* (2006.01)

(52) U.S. Cl. .......................... 235/449; 702/75; 702/65; 341/123; 360/46; 360/2

(58) Field of Classification Search ................ 235/449; 360/46, 31, 45, 51, 53; 341/123
See application file for complete search history.

(56) References Cited

U.S. PATENT DOCUMENTS

| | | | | |
|---|---|---|---|---|
| 4,209,843 A * | 6/1980 | Hyatt | ...................... | 708/422 |
| 4,458,322 A * | 7/1984 | Veale | ........................ | 702/87 |
| 5,684,850 A * | 11/1997 | Warburton et al. | ........... | 378/53 |
| 5,774,522 A * | 6/1998 | Warburton | .................. | 378/91 |
| 6,081,768 A * | 6/2000 | Hu et al. | ..................... | 702/66 |
| 6,166,598 A * | 12/2000 | Schlueter | .................... | 330/127 |
| 6,243,652 B1 * | 6/2001 | Fawcett et al. | ............... | 702/65 |
| 6,388,596 B1 * | 5/2002 | Sandusky | ................... | 341/132 |
| 6,476,743 B1 * | 11/2002 | Brown et al. | ............... | 235/449 |
| 6,501,607 B2 * | 12/2002 | Keirn et al. | .................... | 360/31 |
| 6,570,722 B2 * | 5/2003 | Yokozawa et al. | ............. | 360/2 |
| 6,674,786 B1 * | 1/2004 | Nakamura et al. | ........... | 375/340 |
| 6,940,683 B2 * | 9/2005 | Berman et al. | ............ | 360/77.12 |
| 2003/0107412 A1 * | 6/2003 | Melsa | ........................ | 327/108 |
| 2004/0024548 A1 * | 2/2004 | Genther et al. | ................ | 702/75 |
| 2005/0219728 A1 * | 10/2005 | Durbin et al. | ................. | 360/46 |

* cited by examiner

*Primary Examiner*—Thien M. Le
*Assistant Examiner*—Christle I Marshall
(74) *Attorney, Agent, or Firm*—North Weber & Baugh LLP

(57) ABSTRACT

A point of sale terminal includes a microcontroller integrated circuit. In one aspect, a regulator within the IC receives power from a supply voltage terminal and/or a battery terminal. If the regulator does not receive adequate power from either terminal, then energy stored on-chip in a capacitor is used to erase secure memory. In another aspect, pulses of current are made to pulse through conductors of a conductive mesh. A tamper condition is detected if an improper voltage is detected on the IC terminal through which the pulse is conducted. In another aspect, each vendor signs his/her firmware with his own vendor ID. A bootloader uses the vendor ID to lookup a public key that is then used to verify a private key supplied by the firmware to be executed. In another aspect, a magnetic card reader includes a digital peak detector circuit involving programmable positive and negative thresholds.

17 Claims, 10 Drawing Sheets

MAGNETIC CARD BIT ENCODING

MAGNETIC STRIPE READER HAVING DIGITAL PEAK DETECTOR

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Point of Sale Terminal

Figure 1:
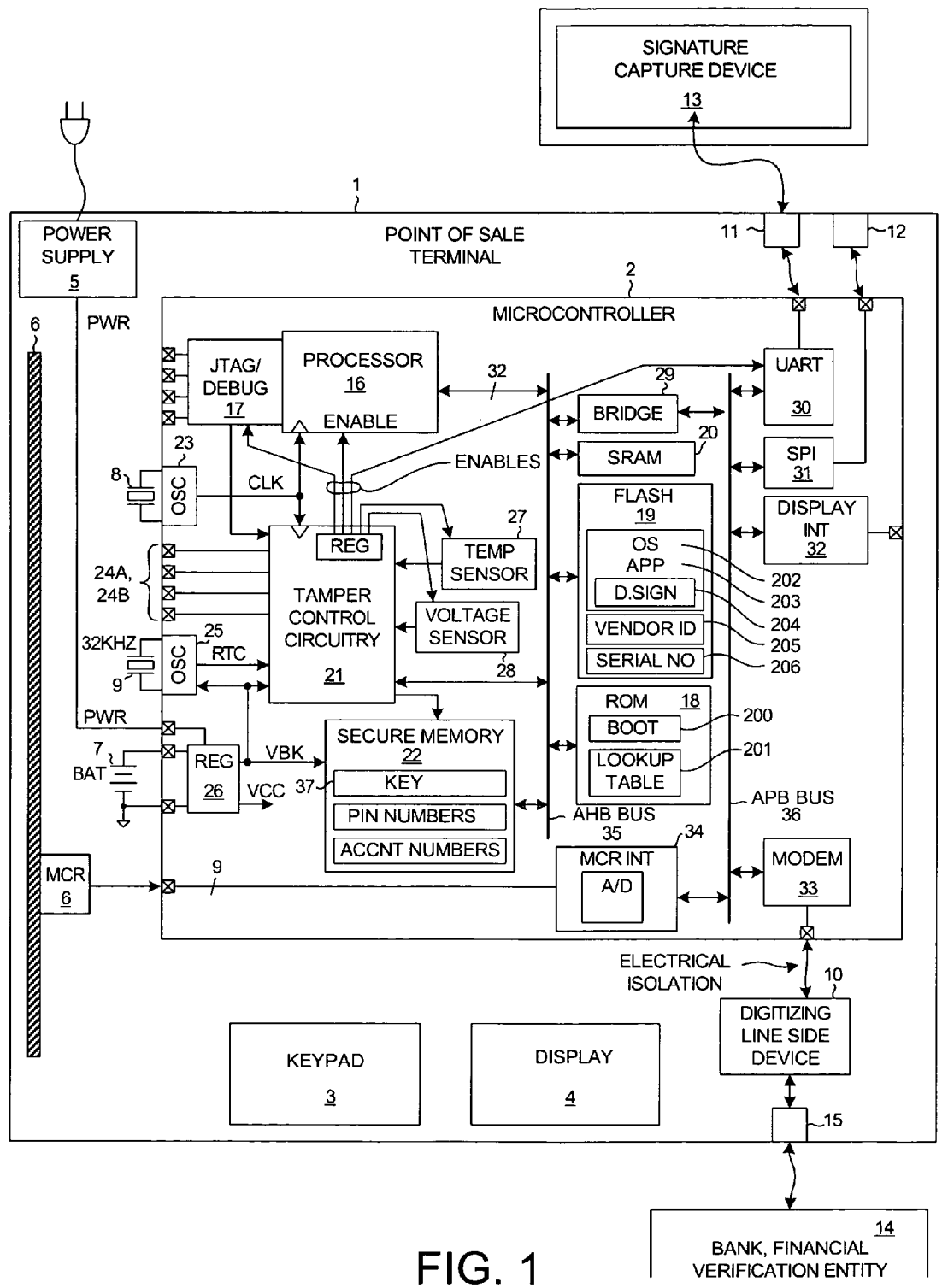
FIG. 1 is a simplified diagram of a point of sale terminal that includes several novel aspects.

FIG. 1 is a schematic diagram of a point of sale terminal 1. Point of sale terminal 1 includes a microcontroller integrated circuit 2, a keypad 3, a display 4, a power supply 5, a magnetic card reader 6, a battery 7, a main system crystal 8, real time clock crystal 9, and a line side device 10. Point of sale terminal 1 has a pair of serial ports 11 and 12. In the illustrated example, point of sale terminal 1 communicates with a signature capture device 13 via serial port 11. Point of sale terminal 1 communicates with a financial institution or other financial verification entity 14 via line side device 10 and a modem port 15. Modem port 15 may be a telephone plug.

Microcontroller integrated circuit 2 includes a processor 16, a JTAG port/debugger 17, an amount of read only memory (ROM) 18, an amount of FLASH program memory 19, an amount of static random access memory (SRAM) 20, tamper control circuitry 21, an amount of secure memory 22, a main system oscillator 23, a plurality of tamper detection terminals 24A and 24B, a real time clock oscillator 25, a supply voltage regulator 26, a programmable temperature sensor 27, a supply voltage sensor 28, a bridge 29, a universal asynchronous receiver and transmitter (UART) 30, a four-wire full duplex serial peripheral interface (SPI) 31, a display interface 32, a modem 33, and a three-track magnetic stripe card reader (MCR) interface 34. Processor 16 can access ROM 18, SRAM 20, FLASH 19, and secure memory 22 via an advanced high performance bus (AHB) 35. Processor 16 communicates with UART interface 30, SPI interface 31, display interface 32, and modem 33 via an advanced peripheral bus (APB) 36. An encryption key 37 is stored in secure memory 22. Secure memory 22 in the present example is battery-backed up SRAM.

The ordinary supply voltage VCC powers all the blocks of microcontroller 2 such that there is minimal drain from battery 7 under normal operating conditions when point of sale terminal 1 is powered by power PWR supplied from power supply 5. If power PWR from power supply 5 is interrupted, then battery 7 provides power such that regulator 26 continues to output backed-up supply voltage VBK to secure memory 22, to tamper control circuitry 21, to real time clock oscillator 25, and to temperature sensor 27. The blocks of microcontroller 2 other than regulator 26, temperature sensor 27, secure memory 22, tamper control circuitry 21, RTC oscillator 25, a minimal amount of FLASH 19, and a minimal amount of ROM 18 are not powered when power PWR from power supply 5 is lost.

Tamper control circuitry 21 contains a circuit that detects if the real time clock (RTC) clock signal received from oscillator 25 has slowed too much or has stopped. This circuit may, for example, involve a peak detect that repeatedly charges a bleeding capacitor. An amplifier detects whether the voltage on the capacitor drops below a predetermined amount. Temperature sensor 27 draws a large amount of current when it is operating. To reduce power consumption, the temperature sensor 27 is periodically powered up approximately eight times a second and the temperature is briefly sensed. The remainder of the time the temperature sensor 27 is not powered and is not drawing power. The real time clock signal (RTC) output by real time clock oscillator 25 is used as the time base to perform this periodic temperature sensing. Accordingly, if a thief were to slow the clocking of the real time clock in order to disable the temperature sensor 27, then the voltage on the capacitor in tamper control circuitry 21 would drop to the point that the amplifier would detect the low voltage tamper condition. The output of the amplifier is therefore a tamper detect signal indicative of whether the RTC clock signal has slowed too much or has stopped.

Programmable temperature sensor 27 outputs a signal to tamper control circuitry 21 that indicates when the temperature is in an illegal temperature range (for example, lower than minus 20 degrees Celsius or higher than plus 110 degrees Celsius). The temperature range is programmable under the control of processor 16 by writing to a control register (not shown) associated with the temperature sensor. The temperature sensor 27 is powered up and the output of the temperature sensor 27 is read approximately eight times a second as set forth above. Voltage sensor 28 outputs a signal to tamper control, circuitry 21 that is indicative of the magnitude of the supply voltage VCC that powers the point of sale terminal. Tamper control circuitry 21 contains a register that sets a first voltage that defines the bottom of a permissible operating voltage range and a second voltage that defines the top of the permissible operating voltage range. Once the point of sale terminal is out of its power-up condition and is operating in normal operation mode, if the supply voltage VCC is detected to be outside this permissible operating voltage range then an "illegal supply voltage condition" is detected.

There are two pairs of tamper control terminals, pair 24A and pair 24B. Each of tamper control terminals 24A extends to an external mechanical switch. The switch is held in the depressed (make) state such that the switch couples an external pull-down resistor to the tamper control terminal. The tamper control terminal is coupled to pullup circuit (not shown) within the microcontroller package. In normal operation, current flows from the pullup circuit, out of the tamper control terminal, across the depressed switch, and through the pulldown resistor to ground. The voltage on the tamper control terminal is at or near ground potential. If a thief were to open the enclosure of the point of sale terminal, then the external switch would no longer be depressed. The switch would open and the pull-up circuit within the microcontroller package would pull the voltage on the tamper control terminal up to the supply voltage. This supply voltage on the tamper control terminal is detected by tamper control circuitry 21 as a tamper condition. There are two such tamper control terminals 24A.

There are two other tamper control terminals 24B. These are designated with reference numerals 24B1 and 24B2. These, terminals 24B1 and 24B2 are to be used in combination with a fine conductive mesh that is disposed over the top of the microcontroller 2 on the printed circuit board within the point of sale terminal. The mesh includes many pairs of very fine wires. The wires of each such pair extend in a serpentine fashion in parallel with one another across the top of the microcontroller. The first of each of the wires of these pairs is coupled to one of the tamper control terminals 24B1, whereas the second of each of the wires of these pairs is coupled to the other of the tamper control terminals 24B2. If any of the wires is broken, then this condition is detected by tamper control circuitry 21. Also, if any part of the first of the wires touches any part of the second of the wires, then this condition is detected by tamper control circuitry 21. Accordingly, if a thief were to attempt to probe terminals on the microcontroller 2 by pushing a probe through the mesh, then the probing would likely cause a first wire to touch a second wire and this tamper condition would be detected. If the thief were to attempt to drill a hole in the mesh to obtain access for a probe, this tamper condition would also be detected.

Battery Voltage Regulator with Stored Erase Energy

Figure 2:
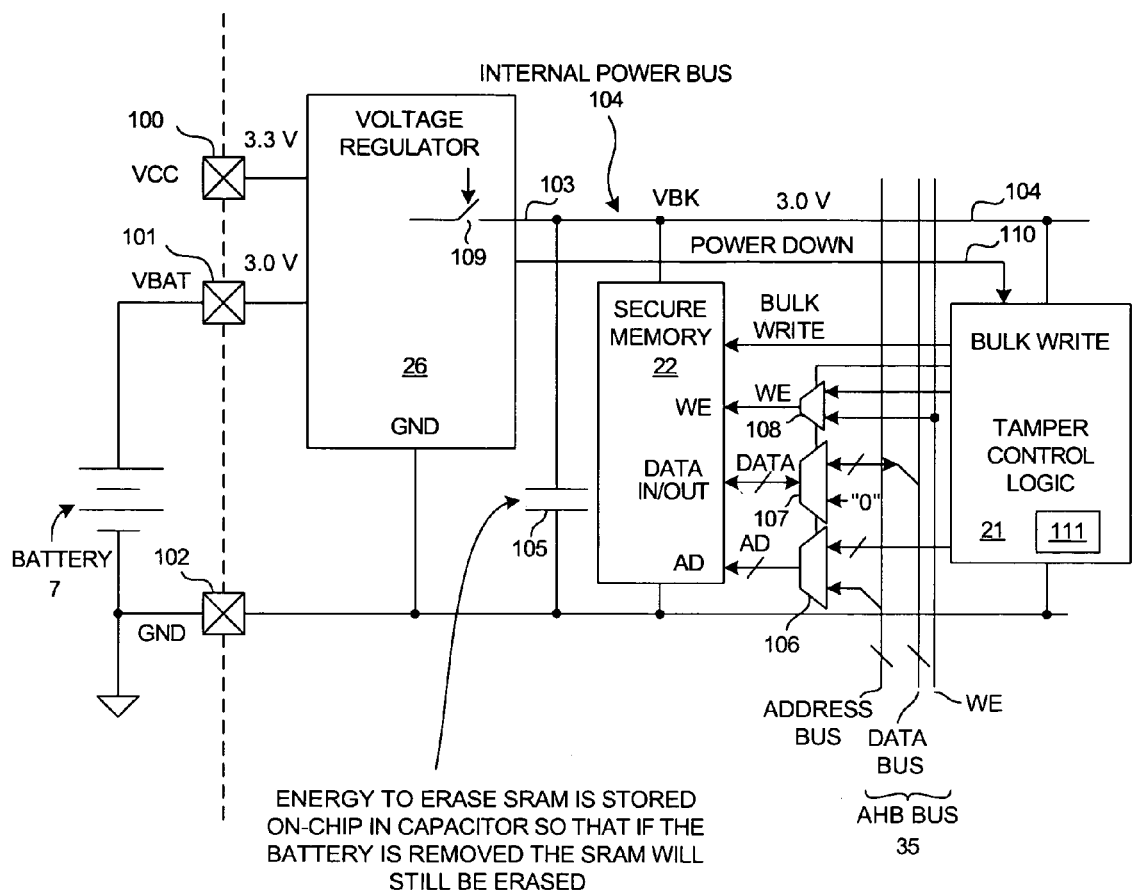
FIG. 2 is a circuit that uses energy stored on-chip in a capacitor to actively erase secure memory upon detection of a tamper condition in accordance with one novel aspect.

FIG. 2 is a more detailed-diagram of a first novel aspect. Sensitive information (for example, encryption keys 37 and personal identification numbers (PIN) numbers and account numbers) are stored in secure memory 22 within microcontroller 2. Voltage regulator 26 is coupled to three terminals of microcontroller 2: a supply voltage terminal (VCC) 100, a battery voltage terminal VBAT 101, and a ground terminal GND 102. In normal operation, voltage regulator 26 is powered by a supply voltage VCC (for example, 3.3 volts) received onto the supply terminal 100. The supply voltage in this example is output by power supply 5. Voltage regulator 26 outputs a regulated DC voltage VBK (for example, 3.0 volts) onto output lead 103 and an internal power bus 104. This supply voltage VBK powers secure memory 22, tamper control circuitry 21, and other selected parts of microcontroller 2. An on-chip capacitance or capacitor 105 is also provided such that a first terminal of capacitor 105 is coupled to internal power bus 104 and such that a second terminal of capacitor 105 is coupled to ground terminal 102. If for some reason the supply voltage VCC received onto terminal 100 is interrupted or cut off, then voltage regulator 26 is powered by the battery voltage VBAT (for example, 3.0 volts) received onto terminal VBAT 101 from battery 7. Voltage regulator 26 regulates the battery voltage VBAT and outputs the regulated DC voltage VBK (for example, 3.0 volts) onto output lead 103 and internal power bus 104. Secure memory 22 is therefore called "battery-backed up secure memory." Capacitor 105 is charged up to the regulated DC voltage VBK and remains at this voltage during normal operation.

If output lead 103 and internal power bus 104 are initially-maintained at the desired. VBK during normal operation and voltage regulator 26 is later unable to maintain that voltage on output lead 103 and internal power bus 104, then capacitor 105 keeps secure memory 22 and tamper control circuitry 21 powered long enough such that tamper control circuitry 21 erases the contents of secure memory 22. In the illustrated embodiment, an address bus multiplexer 106, a data bus bidirectional multiplexer 107, and a write enable multiplexer 108 are provided. Although bidirectional multiplexer 107 is illustrated in the diagram as a simple multiplexer, it transfers data both from the data lines of the AHB bus 35 into secure memory 22 and it also transfers data from secure memory 22 onto the data lines of the AHB bus 35. Although not illustrated in the diagram, multiplexer 107 includes tri-state buffers, an enable control input lead, and a direction control input lead.

The value on the select input leads of multiplexers 106-108, the direction control input lead of multiplexer 107 and the enable control input lead of multiplexer 107 is controlled by tamper control circuitry 21. If the value on the select input leads is at a first value, then multiplexer 106 is controlled such that an address on the address bus of AHB bus 35 is coupled to the address leads of secure memory 22, multiplexer 107 is controlled such that a data value on the data bus of AHB bus 35 is coupled to the data input leads of secure memory 22, and multiplexer 108 is controlled such that the write enable signal on the write enable line of AHB bus 35 is supplied to the write enable input lead of secure memory 22.

If adequate power is not being received onto either supply voltage terminal 100 or battery terminal 101, then voltage regulator 26 isolates terminals 100 and 101 from output lead 103. This is illustrated by switch 109 being put into the open condition. Voltage regulator 26 also signals tamper control circuitry 21 of the power down condition by sending a power down signal across conductor 110 to tamper control circuitry 21. In response, tamper control circuitry 21 changes the control signals being supplied to multiplexers 106-108 such that tamper control circuitry 21 can supply addresses onto the address input leads of secure memory 22, such that a data value of all zeros is supplied to the data input leads of secure memory 22, and such that a write enable signal output by tamper control circuitry 21 will be supplied to the write enable input lead of secure memory 22.

Tamper control circuitry 21 includes a state machine that is clocked by an internal oscillator 111 (for example, a ring oscillator or RC oscillator). Tamper control circuitry 21 addresses locations in secure memory 22 and strobes the write enable signal WE supplied to secure memory 22 so that each memory location within secure memory 22 is addressed and overwritten with the digital zero supplied by multiplexer 107 to the data input leads of secure memory 22. Capacitor 105 is sized such that there is enough energy stored in the capacitor to power tamper control circuitry 21 and secure memory 22 through this entire sequence of multiple writes. Capacitor 105 has an adequately large capacitance that the voltage on internal bus 104 remains within the secure memory's acceptable supply voltage range (for example, 2.8 volts to 3.0 volts) at least until the contents of secure memory have been erased.

Secure Memory Having Bulk Erase

Secure memory 22 in one embodiment is a block of rows and columns of memory static random access memory (SRAM) cells. Secure memory 22 has a single data bus that is used both to receive data during a write operation as well as to output data during a read operation. This need not, however, be the case. In an alternative embodiment, secure memory 22 has data input bus leads and separate data output leads.

Each row of SRAM cells of secure memory 22 includes 1024 memory cells, and there are thirty-two rows. Secure memory 22 has a bulk write mode. Tamper control circuitry 21 places secure memory 22 into the bulk write mode (for example, by driving a special bulk write signal onto a special bulk write terminal on secure memory 22) prior to the sequence described above of successively writing zeros to the memory locations of secure memory 22. In the bulk write mode, an entire row of memory cells is written at the same time in a single write operation. The data value written is the data value present on the least significant data bus lead of secure memory 22. Rather than addressing each successive memory location within secure memory 22, tamper control circuitry 21 only addresses and conducts a bulk write to the first memory location in each row of secure memory 22. The bulk write operation to the first memory location in a row results in a write to all the memory locations of the row. The entire secure memory 22 is therefore written with digital zeros in thirty-two bulk write cycles.

Pulsing Current Through a Tamper Control Mesh

Figure 3:
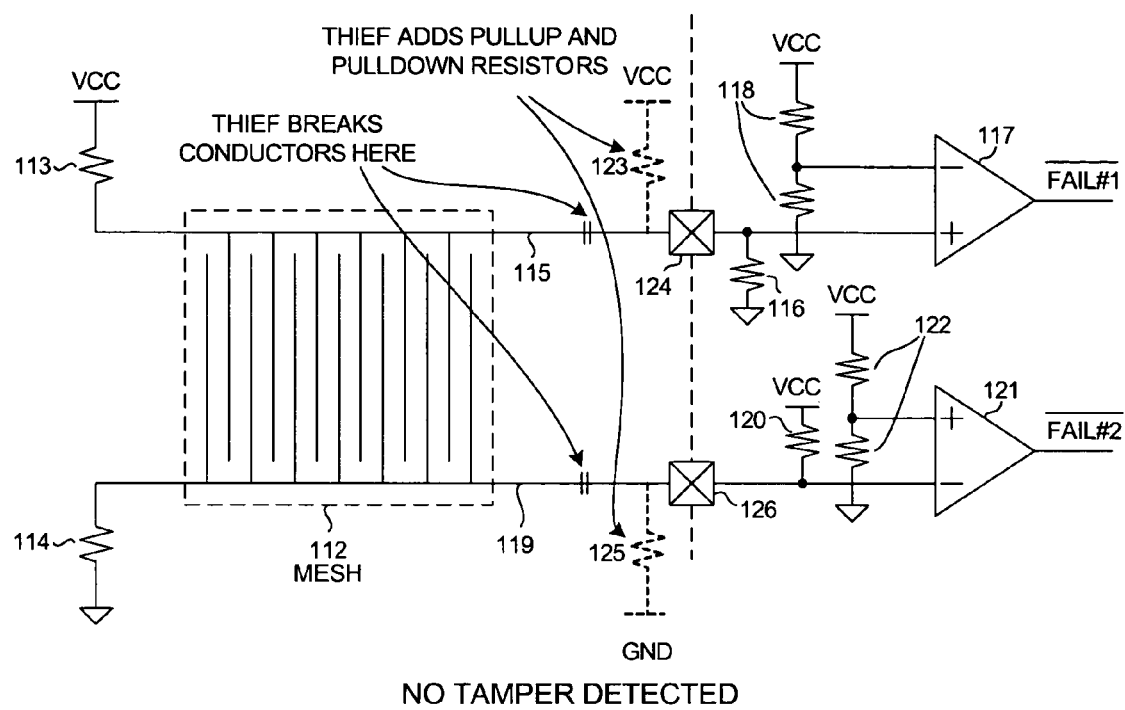
FIG. 3 is a tamper detect circuit that has a weakness as set forth in the description below.

FIG. 3 is a diagram of a tamper detect circuit in accordance with one novel aspect. This tamper detect circuit includes a mesh 112 of fine wires that covers microcontroller 2. Alternating ones of the fine wires are coupled to VCC by a pullup resistor 113, and to ground via a pulldown resistor 114. The voltage on wire 115 is maintained at or close to VCC due to pullup resistor 113 being of a smaller resistance than internal pulldown resistor 116. The voltage on the inverting input lead of comparator 117 is biased at approximately VCC/2 due to a biasing resistor network 118. If wire 115 is broken, or if wire 115 comes into contact with wire 119 (wire 119 is maintained at or near ground potential), then the voltage on the non-inverting input lead of comparator 117 falls from the high voltage (close to supply voltage VCC) to below VCC/2. Comparator 117 detects the voltage on the non-inverting input lead dropping below the bias voltage on the inverting input lead and causes the signal on the output lead of comparator 117 to switch from a digital high to a digital low.

The voltage on wire 119 is maintained at or near ground potential due to pulldown resistor 114 being of a smaller resistance than internal pullup resistor 120. The voltage on the non-inverting input lead of comparator 121 is biased at approximately VCC/2 due to a biasing resistor network 122. This biasing network 122 may be the same biasing network that biases the voltage on the non-inverting input lead of comparator 117. If wire 119 is broken, or if wire 119 comes into contact with wire 115 (wire 115 is maintained at or near VCC potential), then the voltage on the inverting input lead of comparator 121 rises above the bias voltage on the non-inverting input lead, thereby causing the signal on the output-lead of comparator 121 to switch from a digital high to a digital low. Wires 119 and 115 are spaced very close to one another such that an attempt to probe through the wire mesh 112 will likely result in either the touching of two wires that are maintained at the two different voltages or the breaking of one or more of the wires. Either condition is detected as a tamper condition.

A problem may, however, exist in that a thief may attach a pullup resistor 123 (of small resistance) to tamper terminal 124 and may attach a pulldown resistor 125 (of small resistance) to tamper terminal 126 as illustrated. Once the resistors 123 and 125 are added, the thief may cut conductors 115 and 119 at the places indicated. Resistors 123 and 125 prevent the tamper detect circuitry from detecting the tamper detect condition. The thief can then remove mesh 112 from microcontroller 2 and proceed to tamper with the microcontroller. An improved tamper detect circuit is desired.

Figure 4:
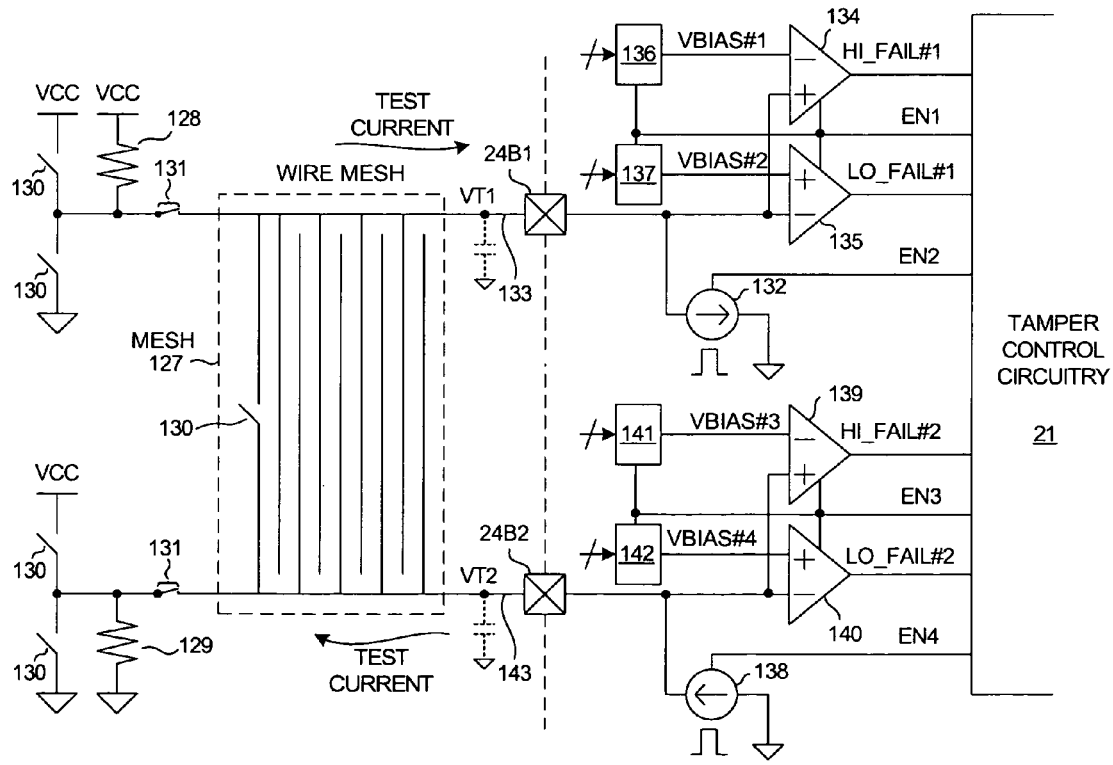

FIG. 4 is a diagram of a second embodiment of a tamper detect circuit. This circuit includes a mesh 127 of fine wires that covers microcontroller integrated circuit 2. The dashed line indicates the boundary of the microcontroller integrated circuit.

Alternating ones of the fine wires are coupled to VCC by a pullup resistor 128, and to ground potential via a pulldown resistor 129, respectively. Switch symbols 130 represent places in conductors that are normally in the open condition but under certain tamper conditions switch to the make (closed) condition. Switch symbols 131 represent places in conductors that are normally in the make (closed) condition but under certain tamper conditions switch to the open condition. The pullup and pull down resistors 128 and 129 are disposed on a printed circuit board close to microcontroller integrated circuit 21 and mesh 127 of fine wires is made to cover the resistors and microcontroller integrated circuit.

There is a ten microampere current source 132 that is associated with tamper control terminal 24B1. This current source 132 is coupled to function as a current sink. Current source 132 can be controlled to sink current from terminal 24B1 and to ground potential. If wire 133 is in tact and there is no tamper condition, then current flows from supply voltage VCC, through external pullup resistor 128, through wire 133, through terminal 24B1, through current source 132 and to ground potential. The voltage on terminal 24B1 is therefore at or near ground potential when this current is flowing.

There are also two comparators 134 and 135 associated with terminal 24B1. Comparator 134 compares the voltage on terminal 24B1 to a bias voltage VBIAS#1 that is output by bias voltage generator block 136. Comparator 135 compares the voltage on terminal 24B1 to a bias voltage VBIAS#2 that is output by bias voltage generator block 137. Each of comparator 134, comparator 135, bias voltage generator block 136 and bias generator block 137 can be enabled by enable signal EN1 output by tamper control circuitry 21. Current source 132 can be enabled by enable signal EN2 output by tamper control circuitry 21.

Tamper control terminal 24B2 has a similar ten microampere current source 138, comparator 139, comparator 140, bias voltage generator block 141, and bias voltage generator block 142. Current source 138, unlike current source 132, drives current onto terminal 24B2. If wire 143 is intact and there is no tamper condition, then the current output by current source 138 flows from current source 138, through terminal 24B2, through wire 143, and through pulldown resistor 129 to ground potential. Under such a condition, the voltage on terminal 24B2 is at or near supply voltage VCC.

Figure 5:
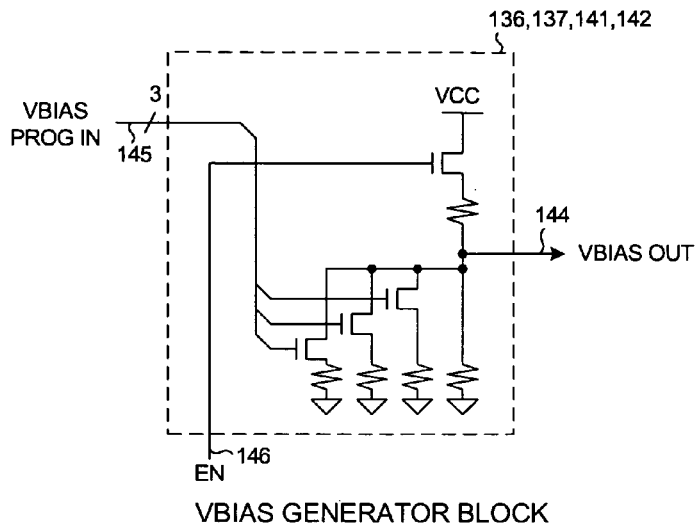
FIGS. 4 and 5 are diagrams of a tamper detect circuit including a conductive wire mesh in accordance with another novel aspect.

FIG. 5 is a simplified diagram of bias voltage generator block 136. The bias voltage generator blocks 137, 141 and 142 of FIG. 4 are identical to bias voltage generator block 136. Bias voltage generator block 136 is a programmable voltage divider circuit made up of resistors and transistors. The magnitude of the bias voltage VBIAS OUT on the output lead 144 of bias voltage generator block 136 is programmable by setting the values on three of the input leads 145 of block 136. There is a bit in a control register (not shown) for each of the input leads of each of the bias voltage generator blocks. Processor 16 under software control writes appropriate values into this control register to control the bias voltage generator blocks 136, 137, 142 and 143. The bias voltage generator can also be disabled such that current does not flow through the voltage divider. Bias voltage generator 136 is disabled when a digital low is present on the fourth input lead EN 146. The value on this fourth input lead EN is controlled by tamper control circuitry 21.

Figure 6:
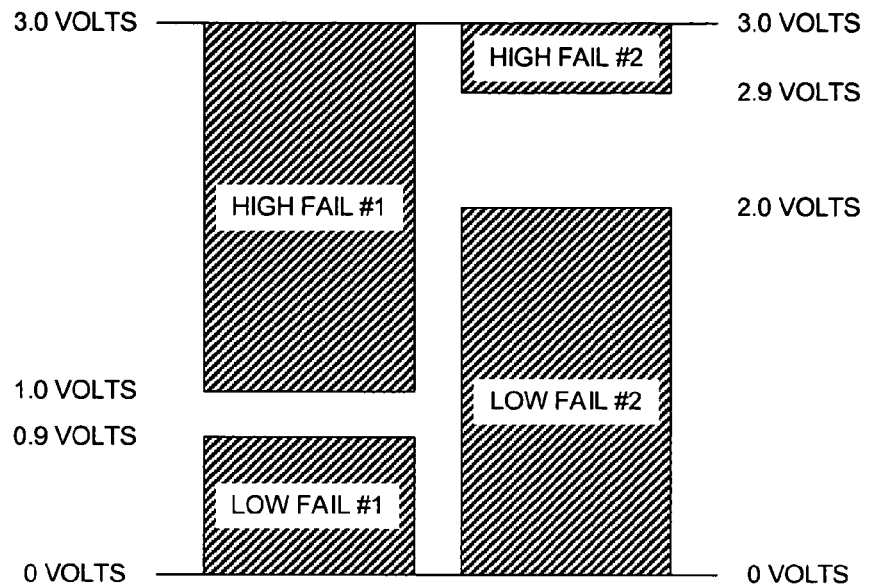
FIGS. 6 and 7 are diagrams illustrative of an operation of the novel aspect of the tamper detect circuit of FIGS. 4 and 5.
Figure 7:
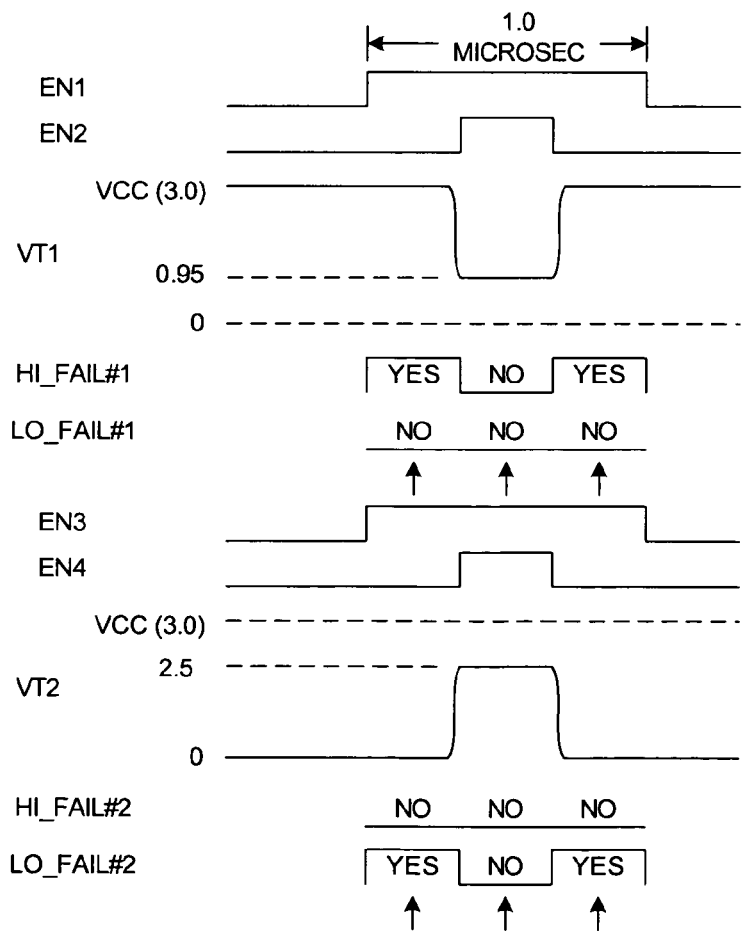

An operation of the tamper control circuit of FIG. 4 is explained in more detail in connection with FIGS. 6 and 7. Initially, the enable signals EN1, EN2, EN3 and EN4 are low as indicated in FIG. 7 such that bias voltage generator blocks 136-137 and 141-142, comparators 134-135 and 139-140, and current sources 132 and 138 are disabled. No current flows through the bias voltage generator blocks, the comparators, or the current sources. This condition is therefore a power saving mode that is maintained for the majority of the time. Test voltage VT1 on terminal 24B1 is held at supply voltage VCC by pullup resistor 128. Test voltage VT2 on terminal 24B2 is held at ground potential GND by pulldown resistor 129. This is illustrated in FIG. 7.

Next, tamper control circuitry 21 asserts enable signals EN1 and EN3 as illustrated in FIG. 7. Comparator 134 compares the voltage on terminal 24B1 with the bias voltage VBIAS#1 output by bias voltage generator block 136. The bias voltage is, in this example, set to be 1.0 volts. Because the voltage on terminal 24B1 is above 1.0 volts, comparator 134 outputs a digital high value of HI-FAIL#1 as indicated by FIG. 7. The voltage on terminal 24B1 is in the "HIGH FAIL #1" range in the left portion of FIG. 6.

Comparator 135 compares the voltage on terminal 24B1 with the bias voltage VBIAS#2 output by bias voltage generator block 137. The bias voltage VBIAS#2 is, in this example, set to be 0.9 volts. Because the voltage on terminal 24B1 is above 0.9 volts, comparator 135 outputs a digital low value of LO_FAIL#1 as indicated by FIG. 7. The voltage on terminal 24B1 is not in the "LOW FAIL #1" range in the left portion of FIG. 6. Tamper control circuitry 21 samples the signals HI_FAIL#1 and LO_FAIL#1 at the time indicated by the upward pointing leftmost arrow in FIG. 7. If the HI_FAIL#1 signal is asserted high and the LO_FAIL#1 signal is not asserted, then there is no tamper condition detected.

The amount of time between the asserting of EN1 and the sampling of the signals HI-FAIL#1 and LO_FAIL#1 is programmable. It can be set by writing a first three-bit number into a control register of tamper control circuitry 21. The first three-bit number indicates a number of clock cycles of an internal clock signal to wait before the sampling. The frequency of the internal clock signal is also programmable. It can be set by writing a second three-bit value into the control register of tamper control circuitry 21. A 100 kHz oscillator supplies a clock signal to a programmable divider circuit that outputs several clock signals of different frequencies. The second three-bit number determines which one of these several clock signals will be used as the internal clock signal timebase that is used for determining when to perform the sampling and that is used in determining the duration of the current pulse.

A similar operation is performed to test the voltage on terminal 24B2. The waveforms are as illustrated in FIG. 7. VBIAS#3 is set to be 2.9 volts. VBIAS#4 is set to be 2.0 volts. The voltage VT2 on terminal 24B2 is at ground potential. As illustrated in FIG. 7, HI_FAIL#2 is asserted high and LO_FAIL#2 is at a digital low.

Next, the enable signals EN2 and EN4 are asserted as illustrated in FIG. 7. These enable signals enable the current sources 132 and 138. Current source 132 pulls a pulse of current from terminal 24B1 whereas current source 138 causes a pulse of current to be output from terminal 24B2. The magnitude of each of these current pulses is ten microamperes (plus or minus three percent). Resistor 128 and the resistance of wire 133 are sized such that the voltage VT1 on terminal 24B1 is 0.95 volts during the current pulse. Resistor 129 and the resistance of wire 143 are sized such that the voltage VT2 on terminal 24B2 is 2.5 volts during the current pulse. This condition is illustrated in FIG. 7. Comparator 134 compares the voltage VT1 on terminal 24B1 with voltage VBIAS#1 (1.0 volts) and comparator 135 compares the voltage VT1 on terminal 24B1 with voltage VBIAS#2 (0.9 volts). The 0.95 volts on terminal 24B1 results in comparator 134 outputting a digital low and comparator 135 outputting a digital low. Comparator 139 compares the voltage VT2 on terminal 24B2 with voltage VBIAS#3 (2.9 volts) and comparator 140 compares the voltage VT2 on terminal 24B2 with voltage VBIAS#4 (2.0 volts). The 2.5 volts on terminal 24B2 results in comparator 139 outputting a digital low and comparator 140 outputting a digital low.

Tamper control circuitry 21 samples the outputs of the comparators 134, 135, 139 and 140 at the time indicated by the second upward pointing arrow in FIG. 7. The time delay between the rising edge of EN2 and the sampling is programmable and is determined by the first and second three-bit numbers described above. If the value of HI_FAIL#1, LO_FAIL#1, HI_FAIL#2 and LO_FAIL#2 are other than as illustrated in FIG. 7, then a tamper condition is detected. The detection of a tamper condition causes the immediate active erasure (overwriting) of the contents of secure memory 22.

Next, enable signals EN2 and EN4 are deasserted as indicated in FIG. 7. This causes current sources 132 and 138 to be disabled and the current pulses to stop. The voltages VT1 and VT2 on terminals 24B1 and 24B2 should therefore return to the supply voltage (3.0 volts) and ground potential, respectively. This condition is sensed by the tamper control circuitry 21 at the time indicated by the third upward pointing arrow in FIG. 7. The time delay between the falling edge of EN2 and the sampling is programmable and is set by writing a third three-bit value into the control register of tamper control circuitry 21. The third three-bit number indicates a number of clock cycles of the internal clock signal to wait before the sampling. Accordingly, the time delay between the falling edge of EN2 and the sampling is determined by the second and third three-bit numbers.

Next, the enable signals EN1 and EN3 are deasserted low as illustrated in FIG. 7 and the current pulse cycle ends.

The only period of time when the circuit of FIG. 4 is drawing power is that period of time when enable signals EN1 and EN3 are asserted. This period of time is made to be a very small proportion of total time (for example, two 1.0 microsecond periods each second, or 1/1000 of the time). The duration of each such period as well as the times between such periods can be varied to make tampering even more difficult.

In some examples, conductors 133 and 143 are not wires of metal, but rather involve traces of conductive ink. Such conductive ink has a fairly constant resistivity. The conductive ink conductors can, for example, be formed on an insulative substrate sheet material using a silk-screening process or a printing process. In examples where conductive ink traces are employed, the pullup and downdown resistors may be omitted.

In some implementations, there is a substantial amount of capacitance on wire 133 and a substantial amount of capacitance on wire 143. These capacitances are represented by the capacitor symbols in FIG. 4 that are shown in dashed lines.

Although this capacitance can be due at least in part to a discrete capacitor that is coupled to the wires by the manufacturer of the point of sale terminal, the capacitance is typically a purely parasitic capacitance. Due to the fixed ten microampere currents sourced or sunk by current sources 132 and 138, and due to the capacitances on wires 133 and 143, the voltages on wires 133 and 143 fall and rise, respectively, during the period that the current sources are pulsed on in accordance with an exponential curve.

Figure 7A:
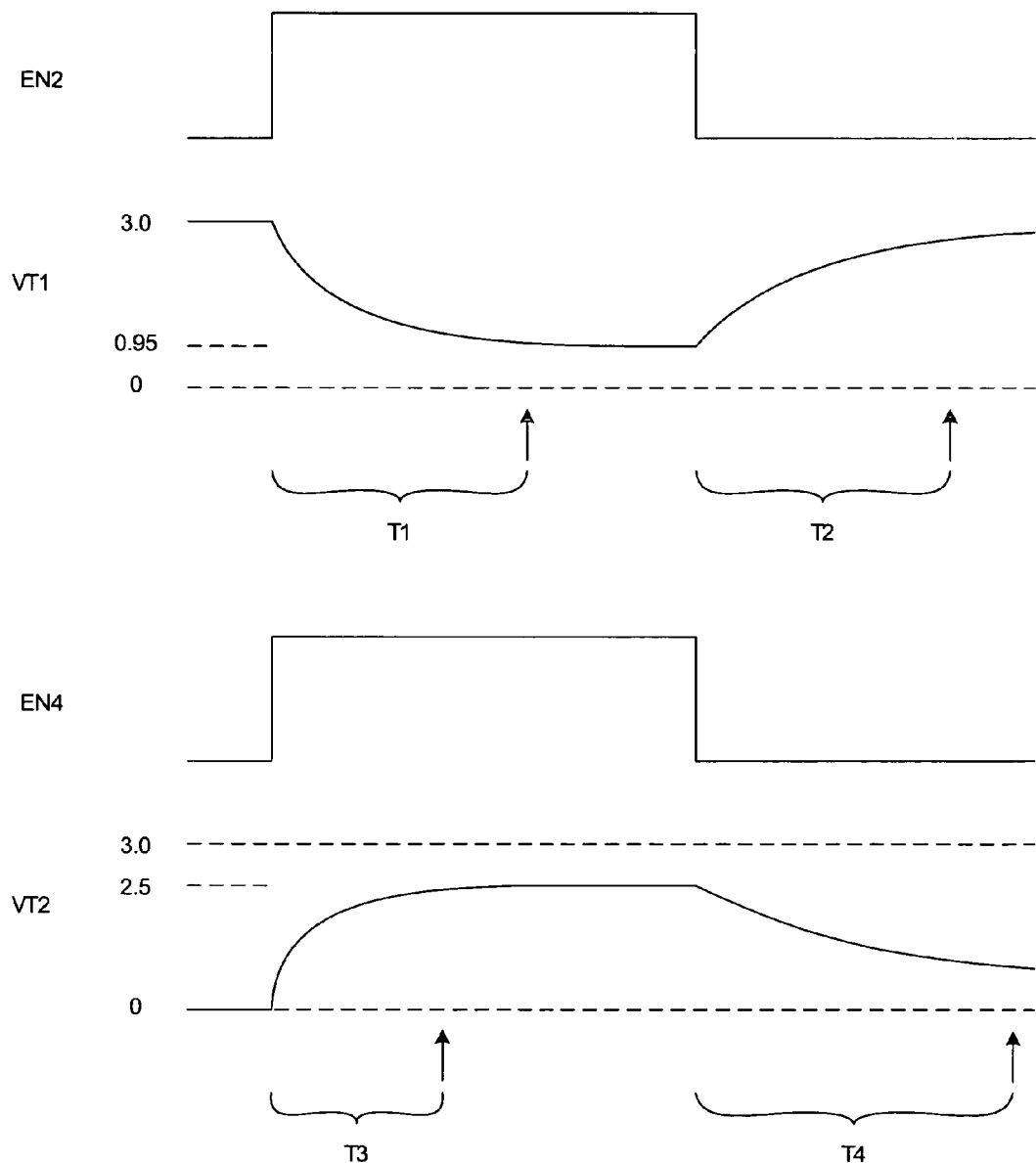
FIG. 7A is a diagram showing the different exponential charging and discharging rates of wires 133 and 143, and the different times to sampling, in one exemplary embodiment. The number of internal clock cycles to sampling, the internal clock signal frequency, the duration of the current pulses, and the thresholds VBIAS#1-VBIAS#4 are user programmable by writing corresponding values into control registers within tamper control circuitry 21.

FIG. 7A illustrates the exponential voltage changes on wires 133 and 143. Note that the voltage VT1 changes in accordance with a first exponential when the current source 132 is on, whereas the voltage VT1 changes in accordance with a second exponential when the current source 132 is off. The first exponential is determined in large measure by the ten microampere current sunk by current source 132, whereas the second exponential is determined in large measure by the resistance of resistor 128. Similarly, the voltage VT2 changes in accordance with a third exponential when the current source 138 is on, whereas the voltage VT2 changes in accordance with a third exponential when the current source 138 is off. The third exponential is determined in large measure by the ten microampere current sourced by current source 138, whereas the fourth exponential is determined in large measure by the resistance of resistor 129. The times T1-T4 until sampling are, in this embodiment, independently programmable by writing four respective three-bit numbers into the control register of tamper control circuitry 21, where each three-bit number indicates a number cycles of the internal clock signal. The frequency of the internal clock signal is programmable by writing another three-bit number into the control register.

Rather than providing a single control register that contains the numbers that control times T1-T4, the numbers that determine the VBIAS#1-VBIAS#3 bias voltages, the frequency of the internal clock signal, and the enable signals EN1-EN4, each of the numbers that controls times T1-T4, bias voltages VBIAS#1-VBIAS#3, and the frequency of the internal clock signal are in one embodiment stored in separate writable registers, where each separate register is writable by processor 16. The values that control the enable signals EN1-EN4 are bits of a single writable register that is also writable by processor 16.

Vendor Id and Serial Number

Figure 8:
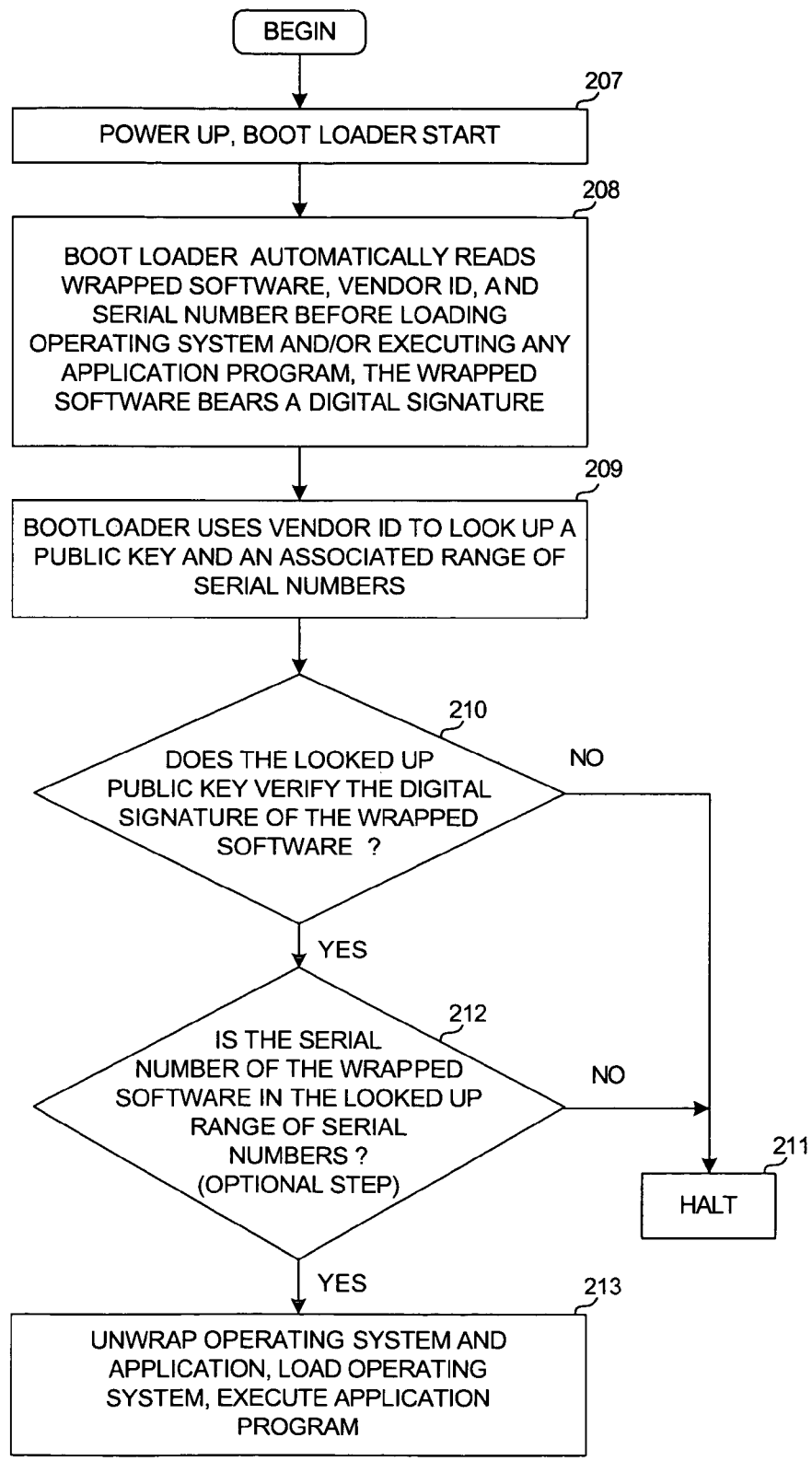
FIG. 8 is a simplified flowchart of a method involving storing a vendor identification number and a serial number in a point of sale-terminal in accordance with another novel aspect.

FIG. 8 is a flowchart in accordance with another novel aspect. ROM 18 (see FIG. 1) stores a bootloader program 200 and a lookup table 201. Lookup table 201 includes, for each one of a plurality of vendor identification numbers (vendor IDs), a public key and an associated serial number range. Each vendor ID has a specified range of serial numbers set forth in the lookup table.

FLASH memory 19 stores operating system code 202 and an application program 203 that are wrapped together so that the wrapped software bears a digital signature 204. The point of sale terminal manufacturer (the point of sale terminal manufacturer is typically a different entity than the manufacturer of microcontroller integrated circuit 2) uses a private key (known only to the point of sale terminal manufacturer and not to the microcontroller manufacturer) to sign the wrapped software with the digital signature 204. The microcontroller manufacturer assigns each point of sale terminal manufacturer a unique vendor identification number that is stored in the lookup table 201 in association with a public key and the associated serial number range. (Key 37 in secure memory 22 is neither the private key nor the public key referred to here, but rather is a different key used to send transaction information to the bank.)

FLASH 19 also stores a vendor identification number 205 associated with the point of sale terminal manufacturer. FLASH 19 also stores a serial number 206. Serial number 206 may, for example, be a serial number that is unique for a particular release of software.

Upon power up (see FIG. 8, step 207), processor 16 begins executing bootloader program 200 out of ROM 18. Execution of the bootloader program causes processor 16 to read (step 208) from FLASH 19 the wrapped software and its digital signature 204, the vendor ID 205, and the serial number 206. This reading occurs before the loading of any operating system code and/or before the execution of any application layer software.

Next (step 209), the bootloader 200 uses the vendor ID 205 to lookup in lookup table 201 in ROM 18 one public key and an associated range of serial numbers. In the present example, there is one public key and one range of serial numbers associated with each different vendor ID.

Bootloader 200 then uses the looked up public key to verify (step 210) digital signature 204. The RSA algorithm may be used to perform the verification. This step is sometimes called "authentication." If digital signature 204 is not verified, then the bootloader halts (step 211). If digital signature 204 is verified, then the bootloader checks (step 212) to see if the serial number 206 read from FLASH is in the looked up range of serial numbers. If the serial number 206 is not in the specified range of serial numbers, then the bootloader halts (step 211). If, on the other hand, the serial number 206 is in the specified range, then bootloader 200 unwraps the operating system code and the application program code (step 213) using the public key, and then loads the operating system 202, and then executes the application 203.

Although an embodiment is set forth wherein each version of the wrapped software has a different serial number, this need not be the case in every embodiment. In one example, the lookup table includes a wildcard range that allows an application with any serial number to check out in step 212. In another example, FLASH 19 stores no serial number, there is no serial number range associated with the vendor identification number, and there is no serial number check in step 212.

Magnetic Stripe Reader Involving Digital Peak Detector

Figure 9:
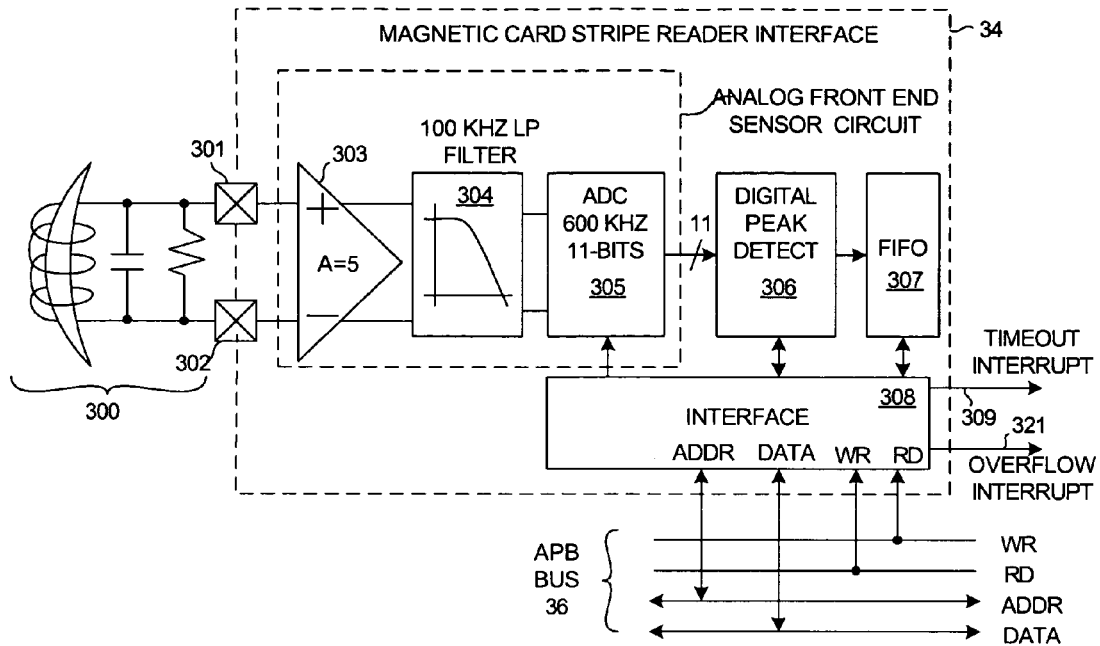
FIG. 9 is a simplified block diagram of a digital magnetic card stripe reader that involves programmable thresholds and hysteresis in accordance with another novel aspect.

FIG. 9 is a block diagram of magnetic card reader interface 34 in accordance with another novel aspect. The simultaneous reading of three stripe tracks is supported. A magnetic pickup circuit 300 is coupled to a pair of input terminals 301 and 302 of microcontroller integrated circuit 2. Magnetic pickup circuits 300 for reading magnetic card stripes are well-known in the art and any suitable magnetic pickup circuit can be employed. The differential signal between input terminals 301 and 302 is amplified by an analog amplifier 303. The differential output leads of analog amplifier 303 are coupled to input leads of an analog low pass filter 304. Low pass filter 304 has a cutoff frequency of 100 kHz. The output leads of analog low pass filter 304 are coupled to the input leads of an analog-to-digital converter 305. Analog-to-digital converter 305, in this example, digitizes the analog signal on its input leads and outputs a corresponding stream of eleven-bit digital values. The rate at which digitizing and creation of the digitized sample values occurs is programmable in a range of from 600 kHz to 800 kHz. The stream of eleven-bit digital values is supplied to a digital peak detector circuit 306. Operation of digital peak detector circuit 306 is explained in further detail below. Digital peak detector circuit 306 pushes information indicative of peaks in the analog signal on terminals 301 and 302 into first-in-first-out (FIFO) memory 307. For example, a 32-bit peak detected value may be pushed onto FIFO 307 when a peak is detected and this 32-bit value may include: an 11-bit value indicative of the amplitude of the detected peak, a 2-bit number indicating the track for which the peak was detected, a 1-bit number indicating whether the peak was a positive peak or a negative peak, a 16-bit value indicating the number of digital samples between the prior detected peak and the present detected peak, and a 1-bit timeout value that indicates whether a timeout occurred after the present peak detected. For each track, FIFO 307 can store eight 32-bit peak detected values. The processor 16 (see FIG. 1) of the point of sale terminal 1 can read peak detected values out of FIFO 307 via interface 308. Processor 16 can read from and write to interface 308 via AHB bus 36, across bridge 29 and via APB bus 36. In addition to or in place of low pass filter 304, digital peak detector circuit 306 can employ simple digital low pass filtering such as, for example, a running average algorithm to prevent possible outlying sample values from being detected as a false peak.

Figure 10:
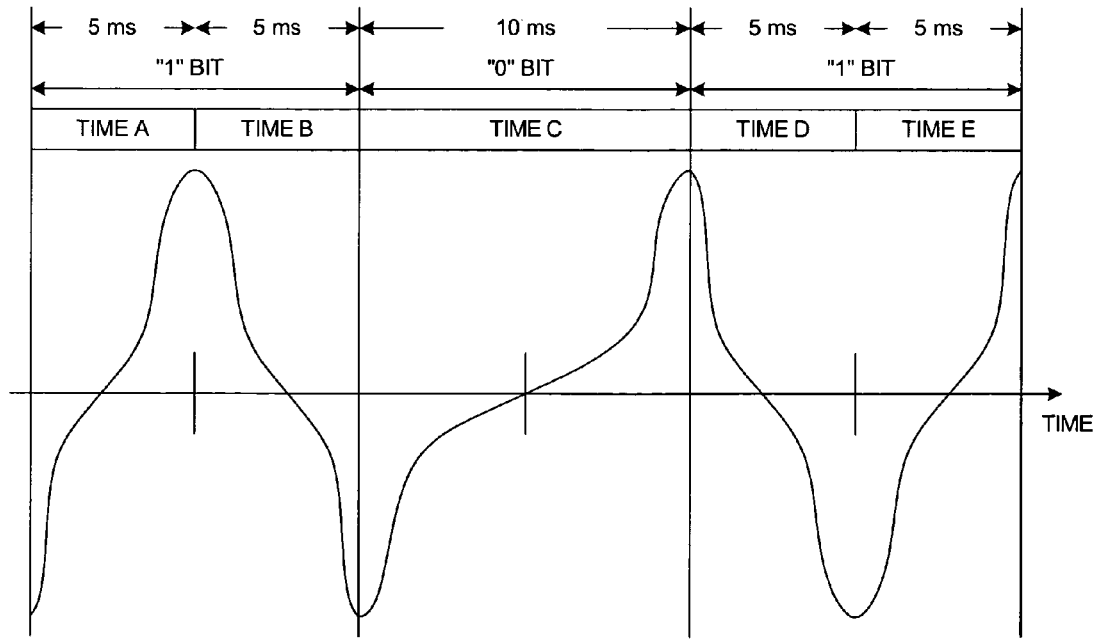
FIG. 10 is a waveform diagram illustrative of waveforms received on the input terminals of the digital magnetic card stripe reader interface of FIG. 9.

FIG. 10 is a simplified waveform diagram that illustrates an ideal differential voltage waveform present between terminals 301 and 302 when a succession of an encoded "1" bit, an encoded "0" bit, and an encoded "1" bit are read from a magnetic card stripe. A logic "0" is encoded as one transition per bit, whereas a logic "1" is encoded as two transitions per bit. The time between bits is dependent upon the rate at which the magnetic card is swiped through the reader. The magnetic card reader interface 34 reads bits up to approximately 1200 bits per second. If the programmable ADC 305 is programmed to sample at a rate of 600 kHz, then the magnetic card reader interface 34 samples each bit from each of three tracks at least 200 times.

Figure 11:
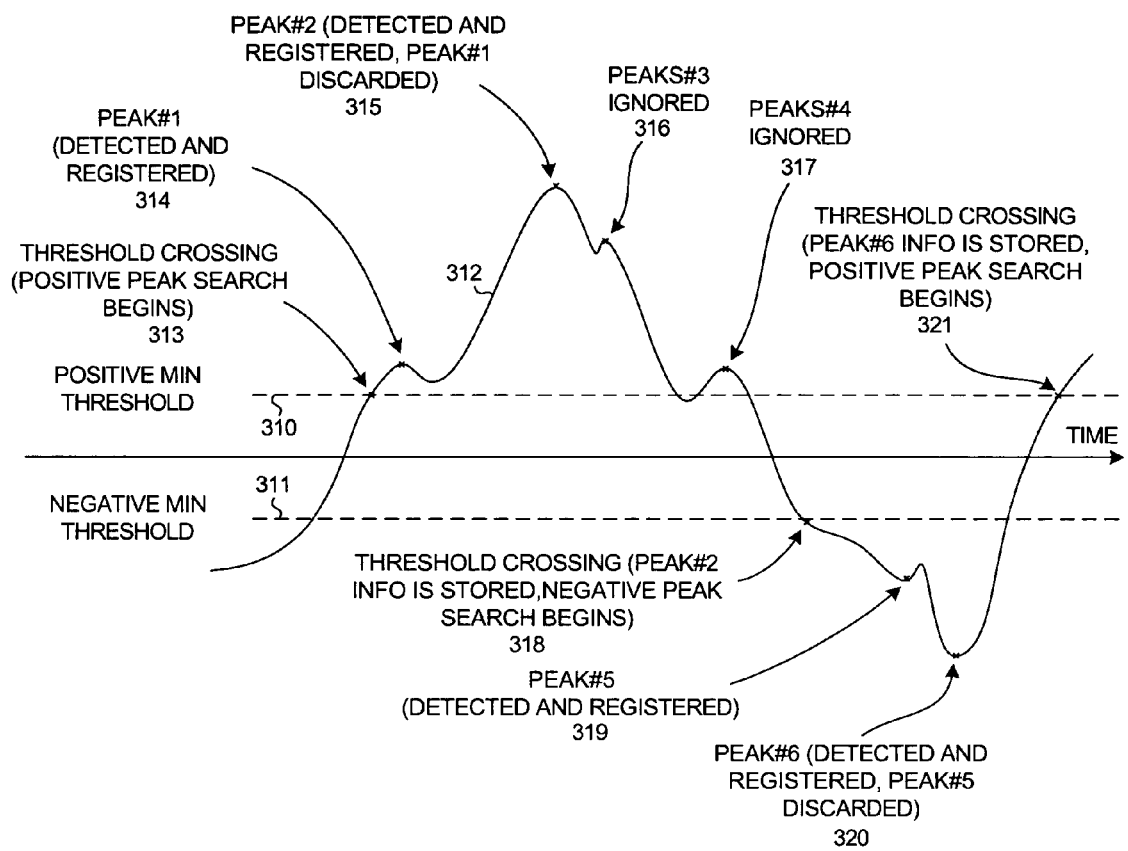
FIG. 11 is a waveform illustrative of a sequence of digital sample values in the digital magnetic card stripe reader interface of FIG. 9.
Figure 12:
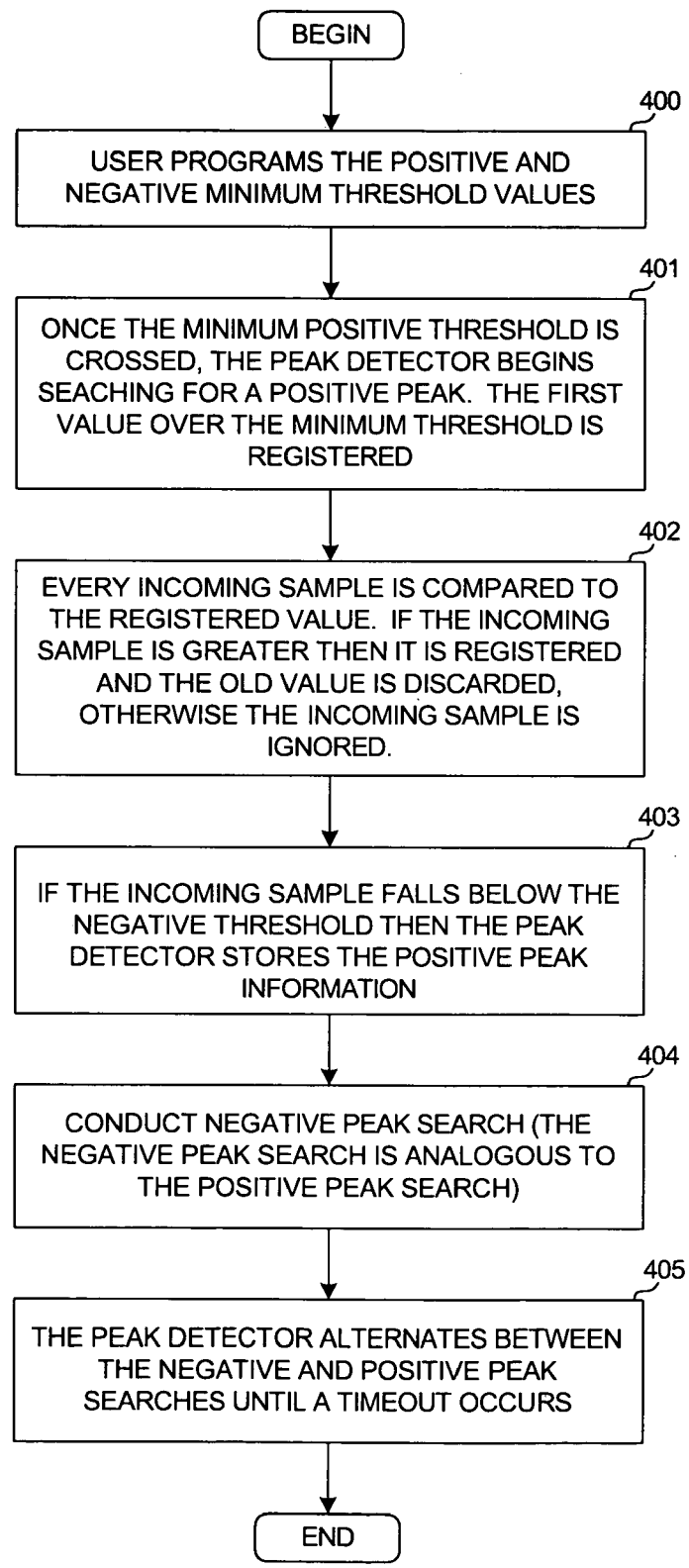
FIG. 12 is a simplified flowchart of a method of detecting peaks in a magnetic card stripe waveform in accordance with the novel aspect of FIG. 9.

FIG. 11 is a simplified waveform usable to describe an operation of a peak detection method performed by magnetic card reader interface 34. FIG. 12 is a flowchart that illustrates the method.

First, processor 16 writes a positive peak threshold value and a negative peak threshold value (step 400) into digital peak detector 306 using interface 308. The positive peak threshold value is a digital value that corresponds to the dashed line 310 in FIG. 11. The negative peak threshold value is a digital value that corresponds to the dashed line 311 in FIG. 11. The positive and negative threshold values afford the magnetic card reader interface circuit a hysteresis characteristic as explained below.

A magnetic card is swiped past the magnetic pickup circuit 300 such that a stream of digital values is output from ADC 305. The digital values correspond to the amplitudes of the waveform 312 of FIG. 11.

Once the minimum positive threshold 310 is crossed (step 401), the peak detector 306 begins searching for a positive peak. The first value over the positive minimum threshold is stored (i.e., registered) in peak detector 306. A running sample counter within peak detector 306 is made to increment on each successive sample received from ADC 305.

Every successive incoming sample is compared (step 402) to the amplitude of the registered sampled amplitude value. If the incoming value is greater than the registered value, then its amplitude is written to FIFO 307 along with the sample counter value. The incoming value and its sample counter value replace the corresponding portions of the previously registered incoming and sample counter values. If, on the other hand, the amplitude of the incoming sample is not greater than the amplitude of the registered value, then the amplitude and sample counter value are ignored. This process continues until the amplitude of the incoming sample falls below the negative minimum threshold value 311.

In the waveform of FIG. 11, the registered sample value increases and increases from the threshold crossing point 313 to peak 314. As the amplitudes of the sample values decrease from peak 314, the registered peak detected value is not changed. The amplitude of the waveform does not cross the negative minimum threshold, but rather begins increasing again. When the amplitude of the incoming sample value exceeds the amplitude of the last registered value, then another amplitude and sample count value is registered. This registering of increasing sample values continues until the second peak 315. When the amplitudes of the incoming sample values decrease from their maximum at peak 315, the amplitudes are not greater than the amplitude of the last registered value. The sample values are therefore ignored according to step 402. All incoming sample values are ignored as the amplitudes of the incoming values falls past false peak 316 and false peak 317. When the amplitude of the incoming sample falls below the negative minimum threshold 311, however, the condition of step 403 (see FIG. 12) is satisfied. The last registered amplitude value is then pushed into FIFO 317 as part of a 32-bit peak detected value.

There is a register within peak detector 306 that stores the sample value of the last-registered peak sample value (in this case the negative peak before positive peak 315). The sample count value of this last-registered peak sample value is subtracted from the registered sample count value stored for peak 315. This difference is stored as the sample count value for peak 315 along with the amplitude value of peak 315 in a 32-bit detected peak value in FIFO 307. Once the subtraction is completed, the sample count value for peak 315 is stored in the last-registered sample value register.

The peak detecting process of steps 401-413 is then repeated (step 404) except that a negative peak is now being searched for. Once the negative minimum threshold 311 is crossed at sample 318 (see step 401), the peak detector 306 begins looking for a negative peak. Every incoming sample is compared to the registered value. If the incoming sample value is smaller, then it is registered along with its sample count value, thereby overwriting the previously registered value. If the incoming sample value is not smaller, then the incoming value is ignored. This process continues until the amplitude value of the incoming sample is greater than the positive minimum threshold value 310. In the example of FIG. 11, the amplitude of the registered value decreased as the amplitude of the waveform passes peak sample count value 319 until the registered value reflects the sample value and sample count value of negative peak 320. The registered value is changed as the amplitude of the waveform decreases. When the amplitude of the incoming sample is greater than positive minimum threshold 310 at sample 321, then the registered amplitude value and sample count value corresponding to negative peak 320 are pushed into FIFO 307 as parts of a 32-bit peak detected value.

The peak detector 306 alternates between positive and negative peak searches (step 405) until a timeout occurs. A timeout is detected if more than a predetermined timeout number of sample counts have passed since the last detected peak. Interface circuit 308 contains a register for storing this predetermined timeout number. Processor 16 loads a desired value into the predetermined timeout number register via AHB bus 35, bridge 29, APB bus 36 and interface circuitry 308. If interface circuit 308 detects a timeout, then interface circuit 308 outputs an interrupt signal on output lead 309. Output lead 309 supplies the interrupt signal to processor 16. A bit in a control register in interface circuitry 308 can be written to by processor 16 to enable or disable the generation of an interrupt signal on timeout interrupt output lead 309.

Interface circuit 308 also maintains a record of how many empty 32-bit FIFO locations remain in FIFO 307 to store 32-bit peak detected values. If processor 16 does not read 32-bit peak detected values out of FIFO 307 fast enough such that eight unread 32-bit peak detected value are stored in FIFO 307 and such that peak detector 306 pushes another 32-bit peak detected value into FIFO 307, then the oldest unread 32-bit peak detected value in FIFO 307 for the track is overwritten without ever having been read by processor 16. Interface circuit 308 detects this overflow condition and generates an overflow interrupt signal on overflow output lead 321. A bit in the control register in interface circuitry 308 can be written to by processor 16 to enable or disable the generation of an interrupt signal on overflow interrupt output lead 321.

Although interface circuit 308 is described having multiple interrupt signal output leads, in other embodiments interface circuit 308 has only one interrupt output lead. The interrupt output lead supplies a general MCR interrupt signal to processor 16. If processor 16 receives an interrupt signal from this interrupt output lead, then processor 16 responds by reading an interrupt status register within interrupt circuit 308. The interrupt status register contains a bit for the FIFO overflow condition and a bit for the timeout condition. If the FIFO overflow condition bit is set, then it was a FIFO overflow condition that caused the interrupt signal to be sent to the processor. If the timeout condition bit is set, then it was a timeout condition that caused the interrupt signal to be sent to the processor. Processor 16 reads the bits in the interrupt status register and determines from which bit is set which interrupt condition it was that caused the interrupt signal to be sent to the processor.

Although the present invention is described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A magnetic card stripe reader circuit comprising:
    an analog input terminal, an analog signal having a plurality of peaks being present on the analog input terminal;
    an analog front end sensor circuit that detects the analog signal on the analog input terminal and outputs a corresponding stream of digital sample values; and
    a digital peak detector circuit that receives the stream of digital sample values, the digital peak detector circuit:
        defines a positive minimum threshold and a negative minimum threshold;
        analyzes a first portion of the stream over a first time period and above the positive minimum threshold such that a plurality of positive peaks are iteratively identified within the first portion of the stream;
        analyzes a second portion of the stream over a second time period and below the negative minimum threshold such that a plurality of negative peaks are iteratively identified within the second portion of the stream;
        identifies a maximum positive peak value within the plurality of positive peaks and a maximum negative peak value within the plurality of negative peaks; and
        outputs a plurality of peak values including a first peak related to the maximum positive peak and a second peak related to the maximum negative peak, each peak value, within the plurality of peak values, being indicative of a corresponding one of the peaks in the analog signal, wherein the digital peak detector circuit is not part of a general purpose processor.

2. The magnetic card stripe reader circuit of claim 1, wherein each plurality of peak values includes a number indicative of an amount of time.

3. The magnetic card stripe reader circuit of claim 1, wherein the analog input terminal, the analog front end sensor circuit, and the digital peak detector circuit are all parts of an integrated circuit, the integrated circuit being disposed in a point of sale terminal.

4. The magnetic card stripe reader circuit of claim 3, wherein the digital peak detector circuit analyzes a set of sample values and identifies a largest sample value in the set as being a peak value.

5. The magnetic card stripe reader circuit of claim 4, wherein a first sample value of the set is the first sample value received into the digital peak detector after an amplitude of a sample value of the stream exceeds a first threshold value, and wherein a last sample value of the set is the last sample value received into the digital peak detector after an amplitude of a sample value of the stream falls below a second threshold value.

6. The magnetic card stripe reader circuit of claim 5, wherein the first threshold value is greater than the second threshold value.

7. The magnetic card stripe reader circuit of claim 6, wherein the first and second threshold values are programmable.

8. The magnetic card stripe reader circuit of claim 1, further comprising: a first-in-first-out memory that stores the plurality of peak values output by the digital peak detector circuit.

9. A method comprising:
    generating an analog signal as a result of a magnetic card being swiped through a magnetic pickup circuit, wherein the analog signal has a plurality of peaks;
    digitizing the analog signal and thereby creating a stream of digital sample values;
    analyzing a first portion of the stream being above a positive non-zero minimum threshold over a first time period such that a plurality of positive peaks are identified within the first portion of the stream;
    analyzing a second portion of the stream being below a negative non-zero minimum threshold such that a plurality of negative peaks are identified within the second portion of the stream;
    identifying a maximum positive peak within the plurality of positive peaks and a maximum negative peak within the plurality of negative peaks; and
    outputting a plurality of peak values including a first peak related to the maximum positive peak and a second peak related to the maximum negative peak, wherein each peak value is indicative of a corresponding one of the peaks in the analog signal, wherein said steps of digitizing and analyzing are performed by dedicated logic circuitry and not by a general purpose processor.

10. The method of claim 9, wherein each plurality of peak values includes a number indicative of an amount of time.

11. The method of claim 10, wherein said analyzing involves storing the plurality of peak values into a first-in-first-out (FIFO) memory.

12. The method of claim 11, wherein said steps of generating, digitizing and analyzing are performed by an integrated circuit in a point of sale terminal.

13. The method of claim 9, wherein said analyzing involves analyzing a set of the sample values and identifying a largest sample value in the set as being a peak value.

14. The method of claim 13, wherein a first sample value of the set is the first sample value in the stream after an amplitude of a sample value of the stream exceeds a first threshold value, and wherein a last sample value of the set is the last sample in the stream after an amplitude of a sample value of the stream falls below a second threshold value.

15. The method of claim 14, wherein said steps of generating, digitizing and analyzing are performed by an integrated circuit in a point of sale terminal, the integrated circuit including a processor, wherein the first and second threshold values are programmable by the processor.

16. The method of claim 15, wherein the plurality of peak values includes positive peak values and negative peak values.

17. The method of claim 15 further comprising:
generating an interrupt signal indicative of a condition of FIFO memory, said interrupt signal being supplied to said processor.

* * * * *